(12) United States Patent
Rygiel

(10) Patent No.: US 7,583,436 B2
(45) Date of Patent: Sep. 1, 2009

(54) SAMPLER CARRIER FOR A CONFOCAL MICROSCOPE AND METHOD FOR FABRICATING A SAMPLE CARRIER

(75) Inventor: Reiner Rygiel, Altrip (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 727 days.

(21) Appl. No.: 10/694,287

(22) Filed: Oct. 27, 2003

(65) Prior Publication Data

US 2004/0087006 A1   May 6, 2004

(30) Foreign Application Priority Data

Oct. 28, 2002   (DE) ................. 102 50 247

(51) Int. Cl.
*G01N 21/01*   (2006.01)
*G02B 21/34*   (2006.01)

(52) U.S. Cl. ...................... 359/398; 359/396

(58) Field of Classification Search ............... 359/396, 359/398, 368
See application file for complete search history.

(56) References Cited

U.S. PATENT DOCUMENTS

| | | | |
|---|---|---|---|
| 3,620,596 A * | 11/1971 | Binnings | 359/398 |
| 3,720,924 A | 3/1973 | Aagard | |
| 3,786,184 A * | 1/1974 | Pieters | 348/345 |
| 4,207,554 A | 6/1980 | Resnick et al. | |
| 4,621,911 A * | 11/1986 | Lanni et al. | 359/386 |
| 4,859,060 A | 8/1989 | Katagiri et al. | |
| 5,776,674 A * | 7/1998 | Ulmer | 435/6 |
| 6,411,434 B1 * | 6/2002 | Eastman et al. | 359/398 |
| 2002/0105722 A1 | 8/2002 | Bewersdorf et al. | |
| 2002/0160400 A1 * | 10/2002 | Lakowicz | 435/6 |

FOREIGN PATENT DOCUMENTS

| | | |
|---|---|---|
| DE | 36 40 340 C2 | 5/1987 |
| DE | 101 00 247 A1 | 7/2002 |
| JP | 59088716 A | 5/1984 |

* cited by examiner

*Primary Examiner*—Joshua L Pritchett
(74) *Attorney, Agent, or Firm*—Houston Eliseeva LLP

(57) ABSTRACT

A sample carrier (30) for microscopy, in particular for confocal microscopy, and a method for producing the sample carrier (30), are disclosed. The sample carrier (30) has a first coverslip (32) and a second coverslip (33). The second coverslip (33) carries an mirror (29) which is equipped in such a way that it surrounds a sample region (34). Also provided is a frame (35) that retains the first and the second coverslip (32 and 33). The coverslips located in the frame (35) form a cavity (38), that cavity (38) being filled with a medium which has approximately the same refractive index as the first and the second coverslip (32 and 33).

13 Claims, 5 Drawing Sheets

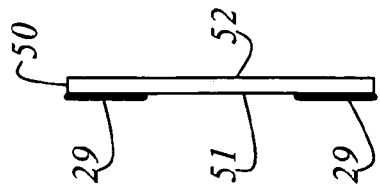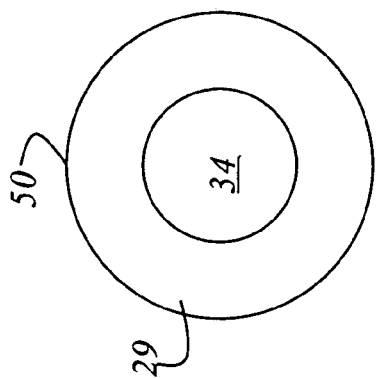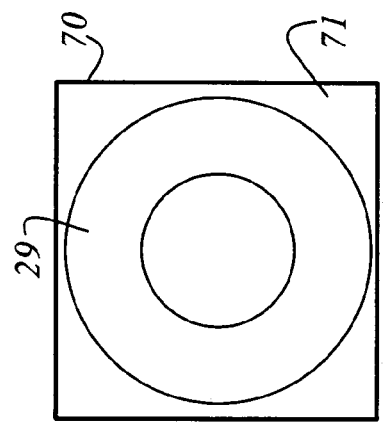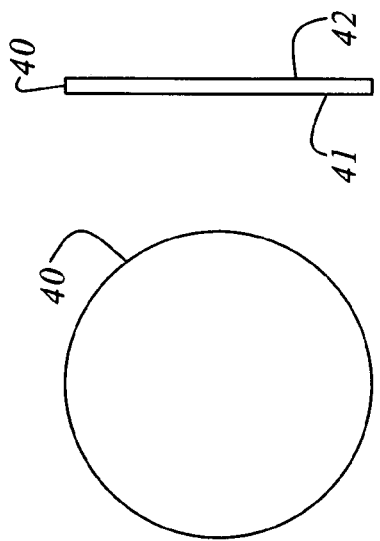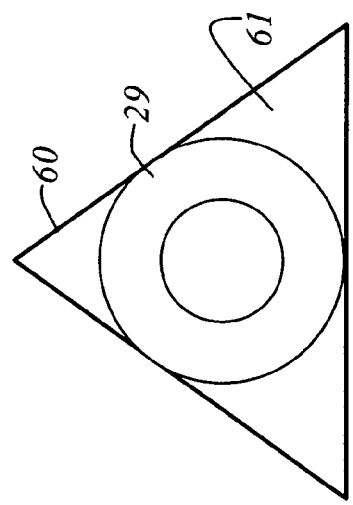

SAMPLER CARRIER FOR A CONFOCAL MICROSCOPE AND METHOD FOR FABRICATING A SAMPLE CARRIER

RELATED APPLICATIONS

This application claims priority of the German patent application 102 50.247.1-42 which is incorporated by reference herein.

FIELD OF THE INVENTION

The invention concerns a sample carrier for a confocal microscope.

The invention furthermore concerns a method for fabricating a sample carrier for a confocal microscope.

BACKGROUND OF THE INVENTION

German Patent Application DE 101 00 247 describes a microscope that is equipped with two objectives so that a specimen carrier can be examined from both sides, thus achieving an improvement in resolution. For that purpose, the specimen carrier comprises two coverslips that define a cavity for the sample to be examined. One of the coverslips carries an optically detectable layer which thus facilitates focusing. The disadvantage of this sample carrier is that the optically detectable layer also extends over the sample to be examined. This undoubtedly influences the detectability of the sample.

Specimen coverslips in which one half of the sample space is mirror coated in half-moon fashion have been used hitherto. Another method is to introduce small mirror-coated flakes into the sample in distributed fashion.

A disadvantage in present confocal microscopy is the removal of alignment means from the focal plane, which creates difficulty or uncertainty when subsequently viewing samples with the microscope that has just been prealigned.

The optical configuration of a microscope must be modified specifically by the removal of the alignment means.

The half-mirror-coated coverslips have the disadvantage that the user often has difficulty finding the mirror-coated surface. In addition, the sample region is so large that the sample often cannot be effectively located. The method with the mirror-coated flakes is not suitable, since the flakes are difficult to find and also subject to damage.

SUMMARY OF THE INVENTION

It is the object of the invention to create a sample carrier for microscopy, in particular confocal microscopy, that makes possible not only examination of the sample but also alignment of the microscope.

This object is achieved by a sample carrier comprising: a first coverslip and a second coverslip, wherein the second coverslip carries a mirror; wherein the mirror surrounds a sample region which is defined on the second coverslip; a frame which holds the first and the second coverslip and thereby provides a cavity between the first and the second coverslip; a medium filled in the cavity, which has approximately the same refractive index as the first and the second coverslip.

A further object of the invention is to create a method with which a sample carrier for examination of a sample is prepared and assembled, the sample carrier containing alignment aids that do not interfere with the sample to be examined.

The aforesaid object is achieved by a method comprising the steps:

applying an aqueous solution, which contains the sample, onto a sample region of a second coverslip of the sample carrier; wherein a mirror is provided on the second coverslip and the mirror surrounds the sample region;

drying the second coverslip in such a way that the water evaporates and the sample remains adhered to the sample region of the second coverslip of the sample carrier;

applying onto the sample region a medium that corresponds substantially to the refractive index of the coverslip being used;

fitting together a first coverslip and the second coverslip, in such a way that the sample is located in a cavity formed by the first and the second coverslip; and introducing the assembled first and second coverslip into a frame.

It has proven to be particularly advantageous if the sample carrier is configured in such a way that it does not disrupt with alignment means the sample that is to be examined. The sample carrier according to the present invention is suitable in particular for confocal microscopy. For that purpose, it encompasses a first coverslip and a second coverslip. One of the coverslips carries an mirror which is equipped in such a way that it surrounds a sample region. The first and the second coverslip are fitted together in such a way that they enclose, in a cavity thereby formed, the sample to be examined. The mirror arranged on the coverslip faces toward the cavity. Also provided is a frame that retains the first and the second coverslip. That cavity is filled with a medium which has approximately the same refractive index as the first and the second coverslip.

The substrate of the first and the second coverslip can be made of anisotropic or isotropic materials that are transparent to the wavelengths used. The mirror is constructed from a material that is reflective for a wavelength region between $\lambda=300$ nm-1300 nm. If the material of the mirror is aluminum or silver, it is equipped with a protective layer. The material of the mirror can also be made only of gold. In addition, the gold of the mirror can also be equipped with a protective layer. Instead of the gold, silver or aluminum mirror coating, a dielectric mirror coating can likewise be provided. It is self-evident that the mirror can assume any desired shape. A symmetrical shape for the mirror is particularly preferred, the mirror being embodied most simply as a ring.

It is particularly advantageous if the coverslips used are configured symmetrically. Round coverslips have proved the simplest for mounting of a frame.

The method for fabricating a sample carrier, in particular for confocal microscopy, is likewise particularly advantageous because it ensures reliable sample preparation. Firstly, an aqueous solution containing at least the sample or several sample portions is applied. The aqueous solution is applied onto a sample region of a second coverslip of the sample carrier. The sample region is defined by the inner region of the, for example, annular mirror. Drying of the second coverslip is then accomplished, so that the water evaporates and the sample remains adhered to the sample region of the second coverslip of the sample carrier. Once the sample and coverslip are dry, a medium corresponding substantially to the refractive index of the coverslip being used is applied onto the sample. A first and the second coverslip are then fitted together in such a way that the sample is located in a cavity formed by the first and the second coverslip. Lastly, the assembled first and second coverslips are mounted in a frame.

The first or second coverslip is secured on the frame using a special adhesive. An objective is arranged on each of the opposite sides of the sample carrier in such a way that the objective's optical axis extends through the sample region, and so that each objective is optically coupled to the sample carrier via an immersion medium on the first and the second coverslip. An annular mirror is particularly advantageous for alignment purposes, since upon displacement of the sample carrier or the optical axis, the distance from the center of the sample carrier to the mirror-coated edge is approximately the same. The symmetry of the mirror-coated annular region thus always permits the mirror-coated region to be found after a certain distance is covered, regardless of the stage displacement travel. In a very particularly advantageous embodiment, the mirror is used for purposes of aligning an interferometric assemblage, for example a 4-pi microscope. For example, the phase relationships of two wave fronts, each reflected from one of the opposite sides of the mirror, are compared by comparing the wave fronts. This equalization operation allows an optimum adjustment of the interferometric assemblage to be performed. The mirror can furthermore be used for wavelength equalization in an interferometric assemblage, in particular in a 4-pi microscope.

BRIEF DESCRIPTION OF THE DRAWINGS

The subject matter of the invention is depicted schematically in the drawings and will be described below with reference to the Figures, in which:

FIG. 4a is a plan view of a circular cover slip;

FIG. 4b is a side view of the coverslip of FIG. 4a;

FIG. 5a is a plan view of a circular coverslip having an mirror;

FIG. 5b is a side view of the coverslip of FIG. 5a;

FIG. 6 is a plan view of a further embodiment of the coverslip having the mirror;

FIG. 7 is a plan view of a further embodiment of the coverslip having the mirror;

DETAILED DESCRIPTION OF THE PREFERRED EMBODIMENTS

Figure 1:
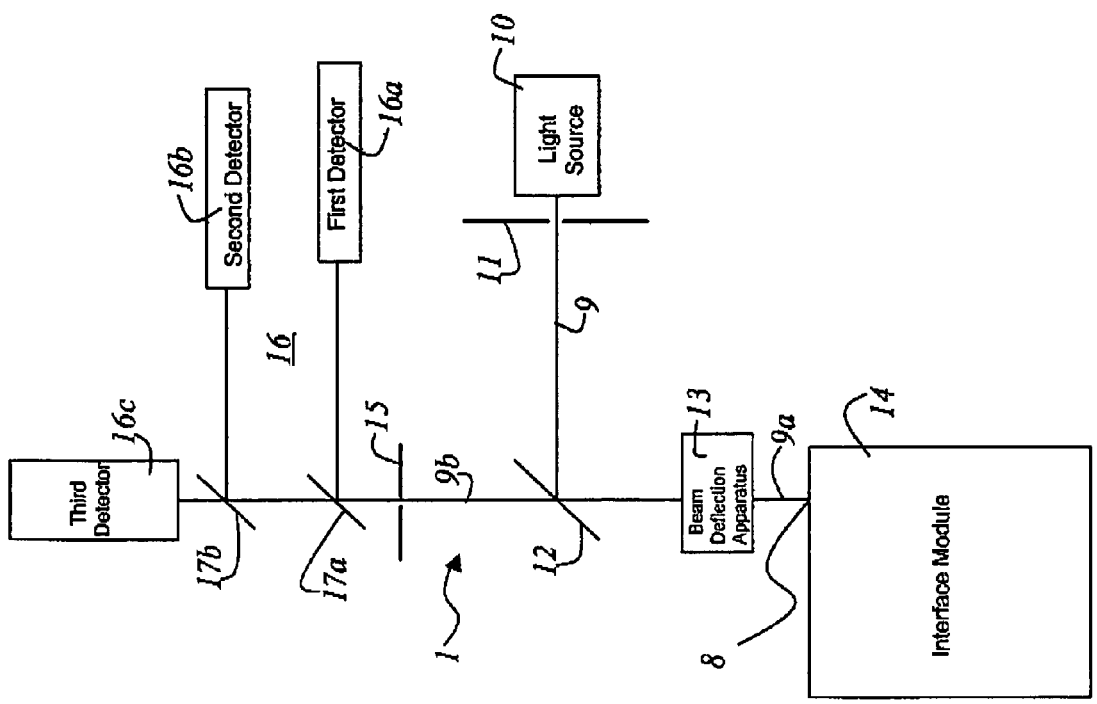
FIG. 1 schematically depicts a 4-pi microscope.
Figure 2:
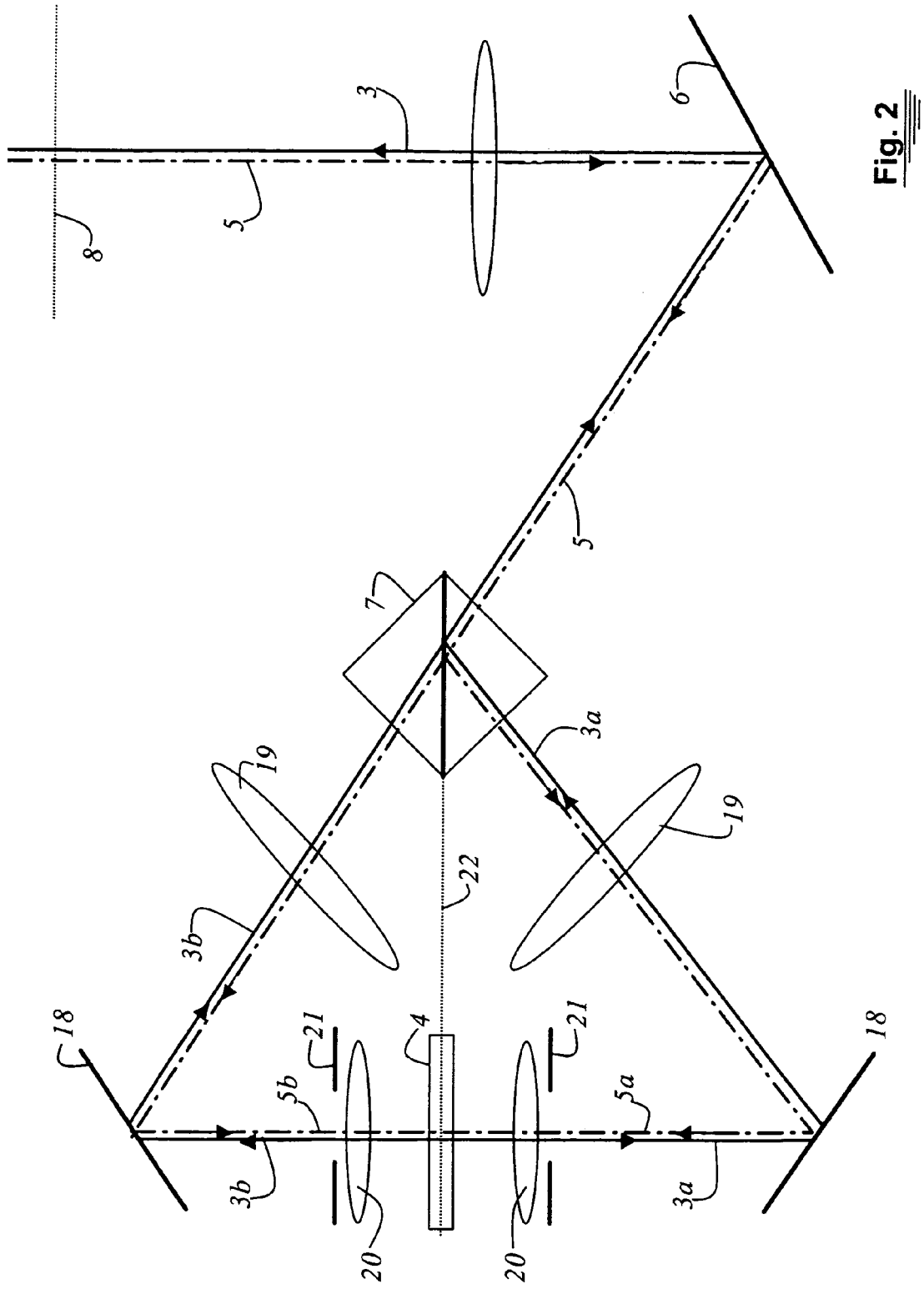
FIG. 2 schematically depicts a portion of the optical beam path of the 4-pi microscope shown in FIG. 1.

FIG. 1 shows an interference microscope that is embodied as a 4-pi microscope 1. A light source 10 defines a light beam 9 that passes through an excitation pinhole 11 and is deflected by a dichroic beam splitter 12 toward beam deflection apparatus 13. Beam deflection apparatus 13 scans or directs light beam 9a in two directions substantially perpendicular to one another so that ultimately, as a result of the scanning motion of beam deflection apparatus 13, the illumination focus in the specimen region scans, for example in meander fashion, a two-dimensional region of the focal plane. Interference module 14, depicted merely schematically in FIG. 1, is shown in FIG. 2. The number 8 here indicates the interface to the microscope, which simultaneously represents a plane corresponding to the entrance pupil plane of the objective of interference module 14. The solid lines labeled 3, 3a, and 3b indicate the light beams coming from specimen 4. The dashed lines labeled 5, 5a, and 5b indicate the light beams sent onto specimen 4. Light beam 5 strikes a beam deflection apparatus 13. Fluorescent light 9b reflected or emitted from specimen 4 travels from interference module 14 to beam deflection apparatus 13. Fluorescent light 9b passes through beam splitter 12 and detection pinhole 15. A detector arrangement 16 is provided behind detection pinhole 15. In the exemplary embodiment disclosed here, detector arrangement 16 comprises a first, a second, and a third detector 16a, 16b, and 16c. The detected light beam passing through detection pinhole 15 is directed by dichroic beam splitters 17a and 17b onto the corresponding detectors. It is self-evident to one skilled in the art that the detector arrangement can also assume other embodiments. The number of detectors and number of beam splitters disclosed here is moreover in no way to be construed as a limitation. A mirror 6, which deflects light beam 5 sent onto specimen 4 and directs it onto a beam splitter 7, is provided in interference module 14. Beam splitter 7 splits light beam 5 sent onto specimen 4 into a first and a second light beam 5a and 5b. A first and a second light beam 3a and 3b proceed from specimen 4. In addition, a mirror 18 is provided respectively in first and second light beams 3a and 3b proceeding from specimen 4, and in light beams 5a and 5b sent onto specimen 4, in order to deflect the fight beams respectively onto specimen 4 and onto beam splitter 7. Respective objectives 20, directed toward one another, are provided on either side of specimen 4. Entrance pupils 21 of objectives 20 are indicated in merely schematic fashion. Also provided in first and in second light beam 3a, 5a, 3b, and 5b are respective lenses 19 which serve to displace entrance pupils 21. Beam deflection apparatus 13 (FIG. 11 is configured such that light beams 5a and 5b sent onto specimen 4 execute a scanning motion in an object plane 22 defined by objectives 20. In the specific case here, fluorescent light 3a and 3b emitted from specimen 4 passes through objectives 20. Fluorescent light 3a and 3b reflected or emitted from specimen 4 is collected by objectives 20 and travels in the direction opposite to light beams 5a and 5b sent onto the specimen. The reflected or emitted fluorescent light 3a and 3b is thus ultimately combined at beam splitter 7 and, after reflection at mirror 6, reflected toward interface 8 to the microscope. Because of the confocal arrangement, only fluorescent light from the focus region of the two objectives 20 can pass through detection pinhole 15. Dichroic beam splitters 17a and 17b arranged after detection pinhole 15 guide the fluorescent light of the various fluorochromes, with which the specimen is specifically marked, to the three detectors 16a, 16b, and 16c that each detect fluorescent light of a specific emission wavelength region. It lies within the specialized ability of one skilled in the art additionally to select other detector arrangements.

Figure 3:
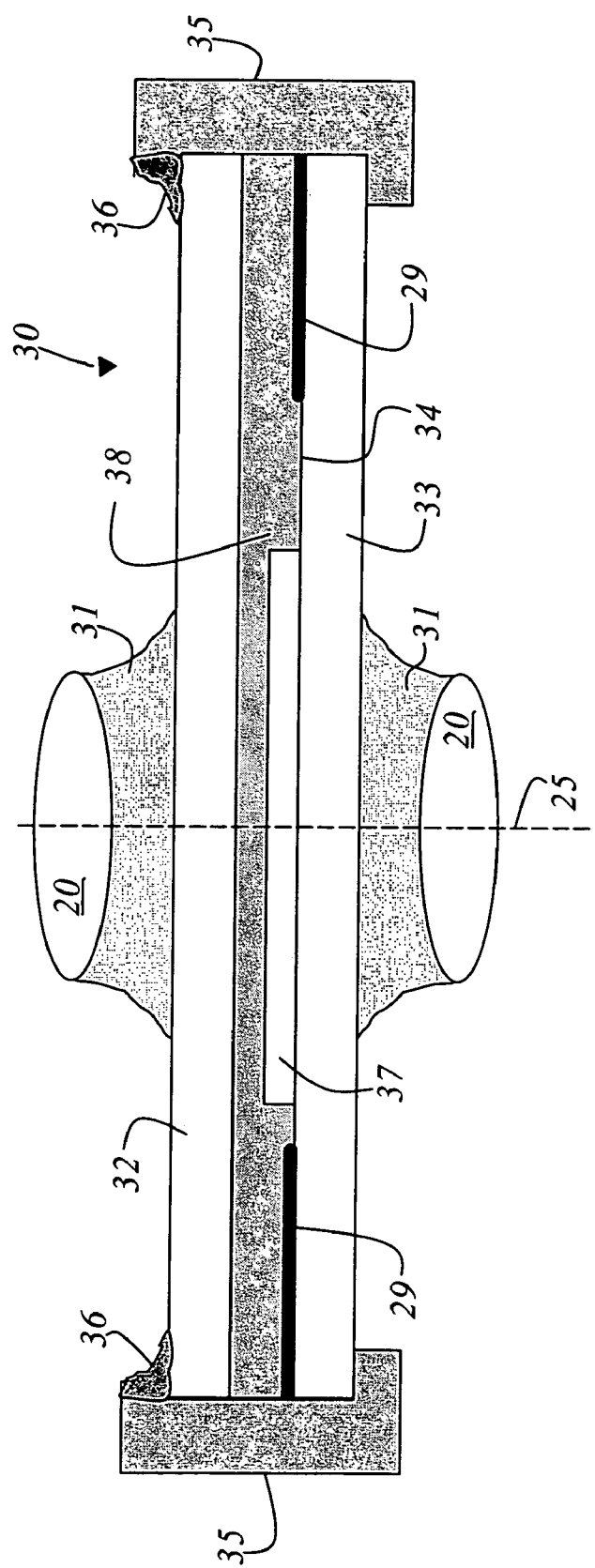
FIG. 3 is a side view of a sample carrier for confocal fluorescence microscopy.

FIG. 3 is a side view of a sample carrier 30 for confocal fluorescence microscopy. Sample carrier 30 comprises a first and a second coverslip 32 and 33. An mirror 29 is mounted on second coverslip 33 in such a way that said mirror surrounds sample region 34. Advantageously, sample region 34 is arranged in the center of the second coverslip. Coverslips 32 and 33 are, as a rule, circular. It is likewise conceivable for an annular mirror 29 to be applied onto a rectangular coverslip 32 or 33. In addition, coverslips in the form of a polygon having sides of equal length can also be used. Specimens 4 mounted in this sample region 34 can be viewed, orthogonally to object plane 22, from both sides in a focal plane of a confocal microscope. Interference measurements can be performed at mirror 29 for purposes of aligning the interferometric assemblage, for example in order to equalize the wavefronts of the two light beams 5a and 5b that are each reflected from one of the two opposite sides of mirror 29. The phase relationships can be compared and coordinated with one another. Using mirror 29, the optical path lengths of the two interferometer arms of the 4-pi assemblage can also be coordinated with one another. A short-pulse laser or a short-coherence light source, such as a halogen lamp, is usually used for this purpose. The configuration of sample carrier 30 comprises a first coverslip 32, in which context the substrate of coverslip 32 can be made of any anisotropic or isotropic clear materials. Provided in addition to first coverslip 32 is a second coverslip 33 whose substrate can be made of any isotropic or isotropic clear materials; mirror 29 is additionally applied on second coverslip 33. The material of mirror 29 can be made of any materials that are suitable for reflecting light in a wavelength region between $\lambda=300$ nm-1300 nm. For example, mirror 29 can be made of an aluminum or silver layer having a protective layer, or a simple gold layer. A dielectric mirror coating is also conceivable. In special cases it is sufficient if the mirror acts in reflective fashion in a specific subregion of the spectrum. In the preferred exemplary embodiment, mirror 29 is present in circular form around the actual specimen region 34. Any other shape is also possible, provided the mirror surrounds the sample region. A rectangular shape with a rectangular or round hole in the center would also be conceivable. This has the advantage that upon displacement of sample carrier 30 perpendicularly to optical axis 25 (defined by objectives 20 that are arranged on either side of sample carrier 30) out of sample region 34 toward any edge region, optical axis 25 always encounters a mirror-coated zone. This is very important and useful in terms of alignment equalization. Similarly, sample 34 is unequivocally and rapidly located again after the alignment operation, and the actual measurement can continue. The assembly of sample carrier 30 can be described as follows. Firstly an aqueous sample (ca. 1 μl) is applied onto specimen region 34, which normally is located in the center of second coverslip 33. Since this is an aqueous sample, it forms a droplet and does not wet the mirrored area. In addition to the actual sample, quality standard beads (e.g. 100 nm in size) can be added to the aqueous solution. These also serve the purpose of alignment: based on the image of the quality standard beads, it is possible to check resolution quality in the three spatial directions. The sample is then treated by means of a drying method. The water evaporates, and an actual sample 37 remains adhering to second coverslip 33 of sample carrier 30. Suitable proteins, for example poly-L-lysine, which were also present in the aqueous sample solution, serve to increase adhesion. A defined quantity (e.g. 1 μl) of a filler material is then applied onto sample region 34, and first and second coverslip 32 and 33 are then placed appropriately on top of one another and immovably joined to one another. For that purpose, this sandwich structure comprising first coverslip 32, the actual sample 37 with the filler material, and second coverslip 33 are placed in a frame 35 and secured using a special adhesive 36. It may suffice for this purpose to secure only one of coverslips 32 or 33 to the frame using special adhesive 36. The special adhesive used can be, for example, paraffin, wax, various lacquers, or plastic fillers such as silicone. Upon assembly of the sandwich structure, the filler material becomes uniformly distributed on the actual sample 37 and uniformly fills a cavity 38 that is formed between first and second coverslip 32 and 33. Because the filler material is distributed uniformly in cavity 38, almost the same refractive index is present everywhere. If quartz coverslips are used, glycerol is a suitable filler material. Other combinations, for example BK7 glass and microscope immersion oil, are likewise conceivable. All that is important is that very few refractive index fluctuations be present in the entire space between objectives 20. It has been found that for a 4-pi application, cavity 38 should be no thicker than 50 μm. As already described in FIG. 2, one respective objective 20, optically coupled to sample carrier 30 via an immersion medium 31, is arranged on each side of sample carrier 30.

FIG. 4a is a plan view of a circular coverslip 40 that is constructed at least partially from a transparent material. FIG. 4b depicts coverslip 40 of FIG. 4a in a side view. Coverslip 40 possesses an upper side 41 and a lower side 42 which is equipped with no additional media or imprint.

FIG. 5a is a plan view of a circular coverslip 50 having an mirror 29. Mirror 29 is applied in such a way that it surrounds sample region 34 on which the sample to be examined is applied. A side view of coverslip 50 is depicted in FIG. 5b. The coverslip possesses an upper side 51 and a lower side 52. Mirror 29 is applied on upper side 51.

FIG. 6 is a plan view of an embodiment of a coverslip 60 having mirror 29 on upper side 61 of coverslip 60. Coverslip 60 has the form of an equilateral triangle. It is self-evident that the coverslip without an mirror has the same shape as coverslip 60 having mirror 29.

FIG. 7 is a plan view of an embodiment of a coverslip 70 having mirror 29 on upper side 71 of coverslip 70. Coverslip 70 is in the shape of a square.

Figure 8:
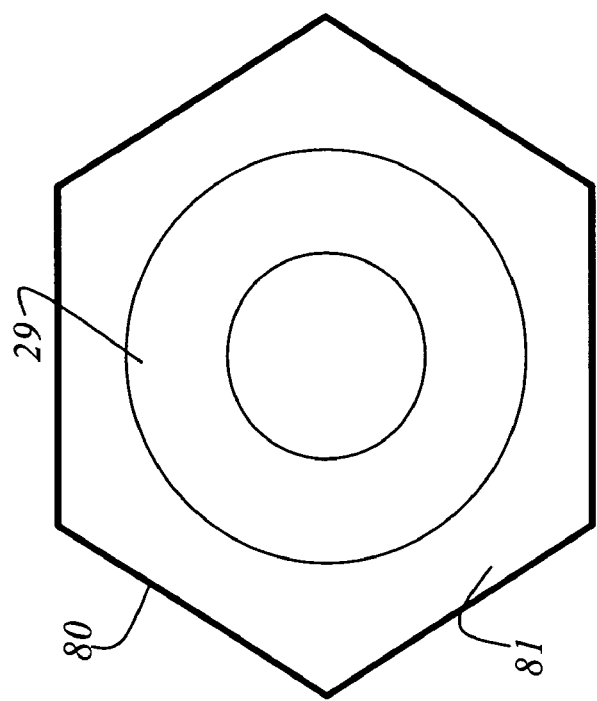
FIG. 8 is a plan view of a further embodiment of the coverslip having the mirror.

FIG. 8 is a plan view of an embodiment of a coverslip 80 having mirror 29 on upper side 81 of coverslip 80. Coverslip 80 is in the shape of a hexagonal polygon. All the sides of the polygon are of equal length.

Figure 9:
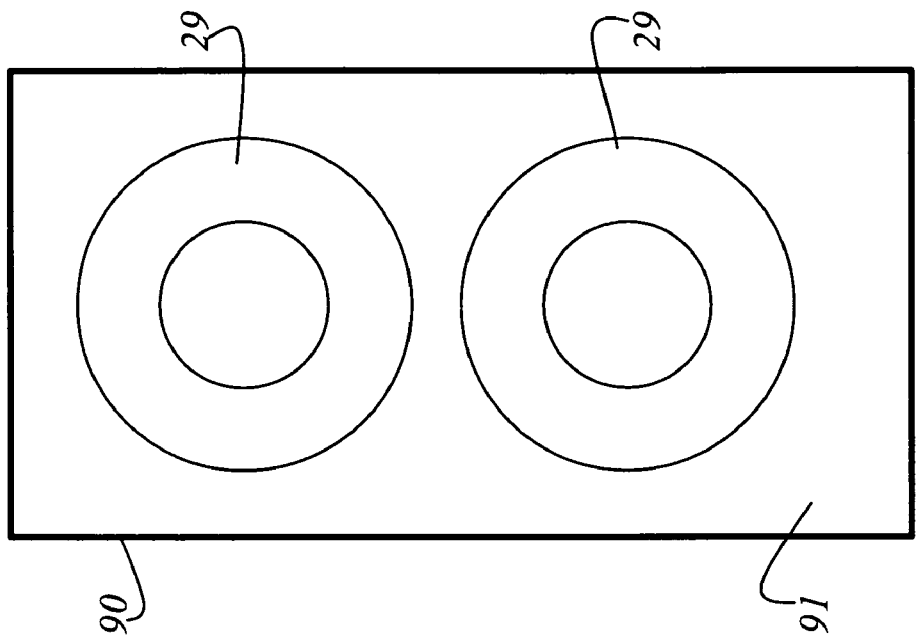
FIG. 9 is a plan view of a rectangular embodiment of the coverslip having the circular mirror.

FIG. 9 is a plan view of an embodiment of a coverslip 90 on which two mirrors 29 are provided on upper side 91 of coverslip 90. Coverslip 90 has a rectangular shape. With this embodiment, the user can prepare and examine two specimens.

Sample carrier 30 disclosed here is suitable in particular for interferometric methods in confocal fluorescence microscopy, and is used therein. These methods are, for example, 4-pi microscopy, standing wave field microscopy, $I^2M$, $I^3M$, and $I^5M$ microscopy, and theta microscopy.

The invention has been described with reference to a particular exemplary embodiment. It is self-evident, however, that changes and modifications can be made without thereby leaving the range of protection of the claims below.

What is claimed is:

1. A sample carrier for a confocal microscope, comprising:
   a first coverslip and a second coverslip immovably secured in a frame and forming a cavity between them, the second coverslip having a mirror-coated zone and a sample region which are defined on the second coverslip;
   a medium uniformly filling in the cavity, the medium having approximately the same refractive index as the first and the second coverslips.

2. The sample carrier as defined in claim 1, wherein the substrate of the first and the second coverslips is made of anisotropic or isotropic materials of approximately the same refractive index and that are transparent to the wavelengths of illumination light used in the microscope.

3. The sample carrier as defined in claims 1, wherein the first and the second coverslips are made of quartz glass; and the medium uniformly filling the cavity is glycerol.

4. The sample carrier as defined in claim 3, wherein the distance between the first and the second coverslips is no greater than 50 μm.

5. The sample carrier as defined in claim 1, wherein the mirror-coated zone on the second coverslip is made from a material that acts reflectively for light in a wavelength region between $\lambda=300$ nm-1300 nm.

6. The sample carrier as defined in claim 5, wherein the material of the mirror-coated zone is aluminum or silver with a protective layer, or gold.

7. The sample carrier as defined in claim 5, wherein the mirror-coated zone is made of a dielectric mirror coating.

8. The sample carrier as defined in claim 1, wherein the mirror-coated zone is a circular ring surrounding the sample region.

9. The sample carrier as defined in claim 1, wherein at least the first or the second coverslips is secured to the frame using a special adhesive.

10. The sample carrier as defined in claim 1, wherein the first and the second coverslips are in the shape of a circle.

11. The sample carrier as defined in claim 1, wherein the first and the second coverslips possess the shape of a polygon with sides of identical length.

12. The sample carrier as defined in claim 1, wherein the first and the second coverslips are in the shape of a rectangle.

13. The sample carrier as defined in claim 1, wherein the confocal microscope is an interferometric fluorescence microscope, such as 4-pi microscope, a standing wave field microscope, $I^2M$, $I^3M$, and $I^5M$ microscope, and a theta microscope.

* * * * *

UNITED STATES PATENT AND TRADEMARK OFFICE
CERTIFICATE OF CORRECTION

| | |
|---|---|
| PATENT NO. | : 7,583,436 B2 |
| APPLICATION NO. | : 10/694287 |
| DATED | : September 1, 2009 |
| INVENTOR(S) | : Reiner Rygiel |

Page 1 of 1

It is certified that error appears in the above-identified patent and that said Letters Patent is hereby corrected as shown below:

On the Title page of the patent, item (54), change "Sampler" to --Sample--.

In column 1, line 1, change "Sampler" to --Sample--.

Signed and Sealed this

Third Day of November, 2009

David J. Kappos
*Director of the United States Patent and Trademark Office*